United States Patent
Harris et al.

(10) Patent No.: US 6,947,436 B2
(45) Date of Patent: Sep. 20, 2005

(54) METHOD FOR OPTIMIZING FORWARD LINK DATA TRANSMISSION RATES IN SPREAD-SPECTRUM COMMUNICATIONS SYSTEMS

(75) Inventors: John M. Harris, Chicago, IL (US); Phil Fleming, Glen Ellyn, IL (US); Nol Rananand, Tapra (TH)

(73) Assignee: Motorola, Inc., Schaumburg, IL (US)

( * ) Notice: Subject to any disclaimer, the term of this patent is extended or adjusted under 35 U.S.C. 154(b) by 940 days.

(21) Appl. No.: 09/775,373

(22) Filed: Feb. 1, 2001

(65) Prior Publication Data

US 2002/0146024 A1 Oct. 10, 2002

(51) Int. Cl.[7] ............................................. H04L 12/28
(52) U.S. Cl. ......................... 370/417; 370/235; 370/252
(58) Field of Search ................................. 370/230, 232, 370/233, 234, 235, 252, 253, 468, 477, 335, 342, 412, 417, 428, 429

(56) References Cited

U.S. PATENT DOCUMENTS

| 5,566,175 | A | * | 10/1996 | Davis | 370/468 |
| 6,097,733 | A | * | 8/2000 | Basu et al. | 370/468 |
| 6,393,012 | B1 | * | 5/2002 | Pankaj | 370/342 |
| 6,414,943 | B1 | * | 7/2002 | Hwang et al. | 370/310 |
| 6,724,776 | B1 | * | 4/2004 | Jeffries | 370/468 |
| 6,744,808 | B1 | * | 6/2004 | Walley et al. | 375/146 |

* cited by examiner

Primary Examiner—Ricky Ngo
Assistant Examiner—Christine Ng
(74) Attorney, Agent, or Firm—Lalita W. Pace

(57) ABSTRACT

An apparatus and method that optimizes the data rate for forward link data transmissions in a spread-spectrum communications system 106 is provided. The spread-spectrum communications system 106 comprises a wireless infrastructure 103, at least one wireless mobile receiving device 105, and an radio frequency (RF) forward link 104 between the wireless infrastructure 103 and the wireless mobile receiving device 105. The data rate of the RF forward link 104 is optimized in the wireless infrastructure 103 by estimating or measuring the bottleneck link speed of the data transmission and adjusting the data rate for the RE forward link 104 according to several embodiments of a data rate optimization algorithm. The algorithm creates an optimum range for the data rate of the RF wireless link 104 which maximizes system capacity and reduces transmission delays to the wireless mobile receiving device 105.

17 Claims, 3 Drawing Sheets

US 6,947,436 B2

METHOD FOR OPTIMIZING FORWARD LINK DATA TRANSMISSION RATES IN SPREAD-SPECTRUM COMMUNICATIONS SYSTEMS

FIELD OF THE INVENTION

The present invention relates generally to communications systems and, in particular, to data transmission within a spread-spectrum communications system.

BACKGROUND OF THE INVENTION

Communications systems are well known and consist of many types including land mobile radio, cellular radiotelephone, personal communications systems, and other communications system types. Within a communications system, transmissions are conducted between a transmitting device and a receiving device over a communication resource, commonly referred to as a communication channel.

One type of communications system known in the art is a spread-spectrum system. In spread-spectrum systems, all communication signals are transmitted simultaneously in the same transmission bandwidth. This modulation technique spreads the frequency spectrum or information bandwidth of each communication signal using a spreading code. Several different spreading codes are used in spread-spectrum systems including, but are not limited to, pseudo noise (PN) codes and Walsh codes. The codes used for spreading have low cross-correlation values and are unique to each simultaneous communication signal. Spreading codes can be used to separate communication signals from one another in a spread-spectrum communications system. Therefore, spreading codes can effectively limit the number of communication signals that can be simultaneously transmitted via the overall transmission bandwidth. One of the main parameters in determining the spreading code for a given communication signal is the processing gain, which is the ratio of the transmission bandwidth to the information bandwidth. When the processing gain is high, the spreading code does not have to separate communication signals as far apart and more communication signals can be simultaneously transmitted. This correlation between processing gain and spreading codes demonstrates how processing gain can also impact the number of communication signals simultaneously transmitted in a system. Since it is advantageous to keep the processing gain as high as possible, it is equally advantageous to minimize the information bandwidth of individual communication signals, the information bandwidth being inversely proportional to the processing gain.

Spread-spectrum systems include wireless cellular networks that communicate messages to and from mobile devices through a wireless cellular infrastructure. Several types of wireless cellular networks are known in the art and are generally grouped in terms of first generation (1G), second generation (2G) and third generation (3G) technology.

1G wireless cellular networks are based on analog technology. The most widely deployed 1G wireless cellular networks are the advanced mobile phone system (AMPS), Nordic mobile telephone (NMT), and total access communications system (TACS). 2G wireless cellular networks are based on digital technology. 2G wireless cellular networks include IS-95 or cdmaOne, IS-136 or digital AMPS (DAMPS), global system for mobile (GSM), and personal digital cellular (PDC) systems. IS-95 utilizes code division multiple access (CDMA) as its air interface communication protocol. Alternatively, IS-136, GSM, and PDC utilize time-division multiple access (TDMA). 1G and 2G wireless cellular networks currently provide voice services and low-rate data services.

3G is the next generation of wireless cellular technology with its primary focus on seamlessly evolving 2G systems to provide high-speed data services to support various data and multimedia applications, such as web page browsing. To preserve the existing wireless infrastructure, it is preferable for 3G systems to be compatible with existing voice and low-rate data capabilities of 1G and 2G systems. International mobile telecommunications in the year 2000 (IMT-2000) is the 3G specification under development by the International Telecommunications Union (ITU) that will provide standardized requirements for enhanced voice and data services over next generation wireless networks. Proposed 3G wireless cellular networks include cdma2000 and wideband CDMA (WCDMA). Universal mobile telecommunications system (UMTS) is often used synonymously with IMT-2000 and is also frequently used when referring specifically to WCDMA.

The generalized architectural framework of a wireless cellular network is based on the geographic placement of a plurality of base transceiver stations (BTSs), each BTS creating a geographic coverage area known as a cell. A BTS communicates with wireless mobile devices within its cell and such communications are maintained by the wireless cellular network as the wireless mobile devices move geographically from cell to cell. In addition to multiple BTSs, the wireless infrastructure of a wireless cellular network includes at least one base station controller (BSC), at least one selector distributor unit (SDU), and at least one mobile switching center (MSC). Within a wireless cellular network, a forward message refers to a message transmitted by cellular infrastructure equipment for reception by a wireless mobile device. A reverse message refers to a message generated by a wireless mobile device, such as a mobile cellular telephone. The typical wireless cellular communications system communicates with other communications systems, such as a public switched telephone network (PSTN), via the MSC. External interfaces, such as a PSTN interface, provide the wireless cellular network with access to individual computers and distributed computer networks, including local area networks (LANs), wide area networks (WANs), intranets, internets, the Internet, and any other distributed processing and/or storage networks. Within the wireless infrastructure, the MSC communicates with one or more BSCs. A BSC communicates with multiple BTSs. BTSs communicate, over an air interface via a radio frequency (RF) channel, with wireless mobile devices operating within their respective coverage areas through forward and reverse links. An SDU is coupled to the MSC, one or more BSCs, and multiple BTSs. The SDU performs forward link air interface frame distribution to the BTSs.

In a spread-spectrum system that provides wireless access to individual computers and distributed computer networks, it is possible that a given data transmission will be limited in forward link throughput by the throughput of the computer equipment infrastructure, rather than by the wireless link speed. In other words, the bottleneck link speed and information bandwidth of the data transmission is limited by the computer equipment infrastructure. Under such circumstances, transmission bandwidth resources in the spread-spectrum communications system are wasted if a link speed higher than the bottleneck link speed is assigned to the forward link by the wireless infrastructure. In other words, the wireless link speed should not be much faster than the bottleneck link speed established by certain components of the computer equipment infrastructure.

Consequently, a need exists for an apparatus and method which optimizes the data rate for forward link data transmissions in a spread-spectrum communications system in a manner which maximizes usage of the transmission bandwidth while also maintaining a sufficient quality of service (QoS) to the wireless mobile device.

DETAILED DESCRIPTION OF THE PREFERRED EMBODIMENTS

Figure 1:
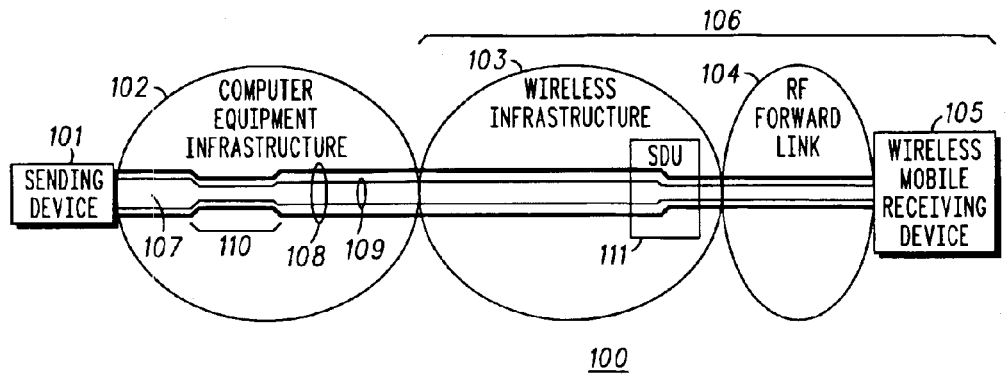
FIG. 1 is a diagram of a typical pathway for an end-to-end data transmission from a sending device to a wireless mobile receiving device in accordance with the preferred embodiment of the present invention.

Turning now to the drawings, wherein like numerals designate like components, FIG. 1 is a diagram of a typical pathway 100 for an end-to-end data transmission from a sending device 101 to a wireless mobile receiving device 105 in accordance with the preferred embodiment of the present invention. The sending device 101 can be a computer, server, or other storage device. Accordingly, as used herein, sending device 101 refers to each of these devices and their equivalents. The wireless mobile receiving device 105 can be a telephone, a cable telephony interface device, a cellular or personal communications system (PCS) radiotelephone, a cordless radiotelephone, a radio, a personal digital assistant (PDA), a pager, a palm-top computer, a personal computer, or other wireless device for wireless communications. Accordingly, as used herein, wireless mobile receiving device 105 refers to each of these devices and their equivalents.

As shown, the sending device 101 is connected via a computer equipment infrastructure 102, a wireless infrastructure 103, and a RF forward link 104 to the wireless mobile receiving device 105. The wireless infrastructure 103, RF forward link 104, and wireless mobile receiving device 105 being a subset of a more comprehensive spread-spectrum communications system 106. In the preferred embodiment of the present invention, the spread-spectrum communications system 106 is a 3G wireless cellular network utilizing a CDMA air interface communication protocol such as cdma2000 or WCDMA. However, in alternate embodiments the spread-spectrum communications system 106 may utilize other wireless technology (e.g., cellular or satellite communications technology) and other system protocols (e.g., IS-95 or cdmaOne, IS-136 or DAMPS, GSM, and PDC).

As shown, the data transmission originates from the sending device 101 having access to the wireless infrastructure 103 via the computer equipment infrastructure 102. The path of the data transmission through the computer equipment infrastructure 102, wireless infrastructure 103, and RF forward link 104 can be characterized as a communication channel 107. In reality, this communication channel 107 is created by routing the data transmission through numerous devices and over a variety of types of transmission paths. Each device and transmission path participating in the data transmission has a link width 108 or throughput capacity. In order to simplify the description of the preferred embodiment of the present invention, FIG. 1 depicts the link width 108 or throughput capacity for the communication channel 107 as either a maximum link width or a minimum link width. In actuality, the link width 108 of the communication channel 107 is based on the individual throughput capacity of each device and transmission line participating in the data transmission.

As shown, the link width 108 of the data transmission is initially based on the throughput capacity of the sending device 101 and is depicted at the maximum link width. The initial data rate of bearer data 109 is equivalent to the link width 108 or throughput capacity of the sending device 101. (The initial data rate of bearer data 109 is not shown in FIG. 1.) When the data transmission encounters a device or transmission line with a lower throughput capacity, a bottleneck 110 is created and the data rate of bearer data 109 is limited according to the throughput capacity of the slower device or transmission line. The device or transmission line with the lowest throughput capacity defines the bottleneck link speed for the communication channel 107. It is possible for the bottleneck link speed for the end-to-end data transmission from the sending device 101 to the wireless mobile receiving device 105 to be established by a device or transmission line within the computer equipment infrastructure 102. This situation is depicted by the bottleneck 110 of FIG. 1 in the computer equipment infrastructure 102. Under such circumstances, the data rate of bearer data 109 is limited to the data rate at the bottleneck 110 in the computer equipment infrastructure 102 for the remainder of data transmission via the communication channel 107. (The data rate of bearer data 109 is limited to the data rate at the bottleneck 110 is shown in FIG. 1.) The data rate of bearer data 109 remains at the bottleneck link speed even if the link width 108 of subsequent devices and transmission lines participating in the data transmission provide a higher throughput capacity. Therefore, limitation of the link width 108 or throughput capacity of subsequent devices and/or transmission lines to at or near the bottleneck link speed has no detrimental impact on the overall data transmission. Accordingly, where such a limitation of the link width 108 or throughput capacity provides economy and/or efficiency to the overall communications system, such as in the spread-spectrum communications system 106, it would be beneficial and advantageous to do so.

In the spread-spectrum communications system 106, limiting the link width 108 of individual data transmissions is desirable because it permits the comprehensive communications system to establish more communication channels 107, thereby maximizing system capacity. As shown in FIG. 1, the wireless infrastructure 103 of the preferred embodiment includes an SDU 111 that is capable of adjusting the link width 108 in the subsequent communication channel 107 for the subject data transmission to at or near the data rate of bearer data 109 transmitted at the bottleneck link speed. Therefore, while the data rate of the data transmission to the wireless mobile receiving device 105 via the RF forward link 104 is not effected by the adjusted link width 108, the comprehensive spread-spectrum communications system 106 is able to reduce RF waste and maximize system capacity.

Figure 2:
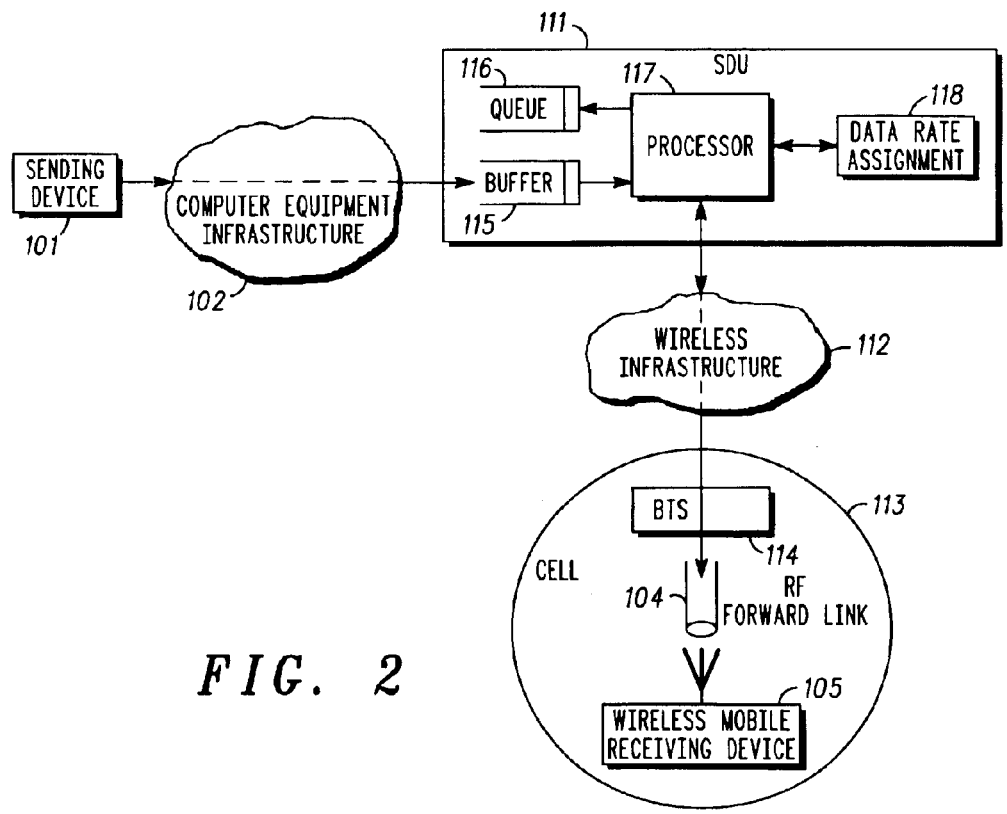
FIG. 2 is a block diagram of pertinent elements of an SDU in the context of a data transmission from a computer equipment infrastructure to a wireless mobile receiving device in accordance with the preferred embodiment of the present invention.

Referring to FIG. 2, the end-to-end data transmission of FIG. 1 is depicted in a block diagram that identifies pertinent elements of the spread-spectrum communications system 106 in accordance with the preferred embodiment of the present invention. As shown, the SDU 111 receives a data transmission from the sending device 101 via the computer equipment infrastructure 102. The SDU 111 performs certain processing functions related to routing and transmitting the data transmission through the wireless infrastructure 112 of the spread-spectrum communications system 106 to the wireless mobile receiving device 105. Ultimately, the appropriate cell 113 of the spread-spectrum communications system 106 is selected and the data transmission is routed to the base transceiver system (BTS) 114. The BTS 114 communicates the data transmission to the wireless mobile receiving device 105 via the RF forward link 104.

As shown, the SDU 111 includes an input data buffer 115, output data queue 116, processor 117, and data rate assignment circuitry 118. The input data buffer 115 receives the incoming stream of packetized data for the data transmission. As described above, the SDU 111 performs certain processing functions related to routing and transmitting the packetized data through the wireless infrastructure 112 of the spread-spectrum communications system 106. Such processing functions are performed by the processor 117 and include maintaining data received via the input data buffer 115 in the output data queue 116 until it is transmitted to the remainder of the wireless infrastructure 112. Such processing functions also include assignment and control of the data rate for such transmissions. The processor 117 determines the appropriate data rate for such transmissions and provides the selected data rate to the data rate assignment circuitry 118. The data rate assignment circuitry 118 ensures that subsequent data transmissions to the remainder of the wireless infrastructure 112 are transmitted at the selected data rate. It should be understood that the SDU 111 has a plurality of input data buffers 115 and output data queues 116 and is capable of processing multiple data transmissions simultaneously, an input data buffer 115 and output data queue 116 being assigned to each data transmission being processed.

Therefore, such data rate processing within the SDU 111 assumes there are N active data transmissions or calls. The maximum link width or data rate for each data transmission or call is referred to as $c^1 \ldots c^N$. The current link width or data rate for each data transmission or call is referred to a $r^1 \ldots r^N$, where $r^1$ must be less than or equal to $c^1$. The queue size for each data transmission or cell is referred to as $q^1 \ldots q^N$. The input data rate for each data transmission or call is referred to as $s^1 \ldots s^N$. The data rate selected for data transmission by the SDU 111 is referred to as the optimized data rate ($r^{opt}$) because it is intended to be at or near the bottleneck link speed of the data transmission that is being processed.

The data rate optimization algorithms to be described in subsequent paragraphs refer to a term ($q_{avg}$) as the "average size of the queue." As disclosed herein, the "average size of the queue" is an accumulated value that is updated during each cycle of the algorithm using a special averaging technique. Rather than a traditional average, the "average size of the queue" is obtained by adding the current size of the queue ($q_n$) to the current average size of the queue ($q_{avg}$) using a weighting factor (a) according to the equation $q_{avg} = a \cdot q_{avg} + (1-a) \cdot q_n$. The weighting factor (a) can range between zero and one. Preferably, the weighting factor (a) is between 0.5 and 0.9 to produce a damping effect with respect to the degree of influence the current size of the queue ($q_n$) has on the average size of the queue ($q_{avg}$). For example, if the weighting factor (a) is 0.7, the updated "average size of the queue" is $0.7 q_{avg} + 0.3 q_n$. Note the inverse relationship between the coefficient (a) of the current average size of the queue ($q_{avg}$) and the coefficient (1−a) of the current size of the queue ($q_n$). When the weighting factor (a) is between 0.5 and 0.9, this inverse relationship causes the updated average to be less influenced by the current size of the queue ($q_n$) and more influenced by the current average size of the queue ($q_{avg}$).

In the preferred embodiment, $r^{opt}$ is determined by applying a data rate optimization algorithm as represented by the following pseudo code:

```
q_avg = a * q_avg + (1-a) * q_n;            /* a ∈ (0,1), average size of queue */
If (q_avg < Q^low)
    r_int = r^opt_n - b;                     /* b could be a fraction of c */
else if (Q^low =< q_avg < Q^high)
    r_int = r^opt_n;                         /* desirable queue region */
else                                         /* q_avg >= Q^high */
    r_int = d * r^opt_n;                     /* d > 1 */
r^opt_{n+1} = (1-f) * r^opt_n + f * r_int;   /* f ∈ (0,1) */
```

Where:

$q_n$ is the current size of the queue for the data transmission;

a is a value between 0 and 1, typically between 0.5 and 0.9;

$q_{avg}$ is the average size of the queue which is accumulated from $q_n$ and dampened according to a;

$Q^{low}$ is the low threshold for the average size of the queue;

$r^{opt}_n$ is the current optimized data rate for the data transmission via the wireless infrastructure;

b is a value less than the current optimized data rate;

$r_{int}$ is an internal variable used in calculating the optimized data rate;

$Q^{high}$ is the high threshold for the average size of the queue;

d is a value greater than 1, but less than $c^N / r^{opt}_n$;

f is a value between 0 and 1; and, $r^{opt}_{n+1}$ is the new optimized data rate that is accumulated from $r_{int}$ and dampened according to f.

The data rate optimization algorithm of the preferred embodiment operates under the premise that an optimized data rate in the spread-spectrum communications system 106 is achieved when the average size of the queue maintained in the SDU for a given data communication is maintained between $Q^{low}$ and $Q^{high}$. If the average size of the queue is below $Q^{low}$, the current data rate is above the bottleneck link speed for the data transmission. Therefore, the data rate in the spread-spectrum communications system 106 can be decreased to increase system capacity without impacting the performance perceived by the user at the wireless mobile receiving device 105. If the average size of the queue is above $Q^{high}$, the current data rate is below the bottleneck link speed for the data transmission. Therefore, the data rate in the spread-spectrum communications system 106 can be increased to reduce transmission delays to the wireless mobile device. When the average size of the queue is between $Q^{low}$ and $Q^{high}$, the current data rate is sufficiently near the bottleneck link speed of the data transmission. Therefore, the data rate in the spread-spectrum communications system 106 will remain relatively constant.

Figure 3:
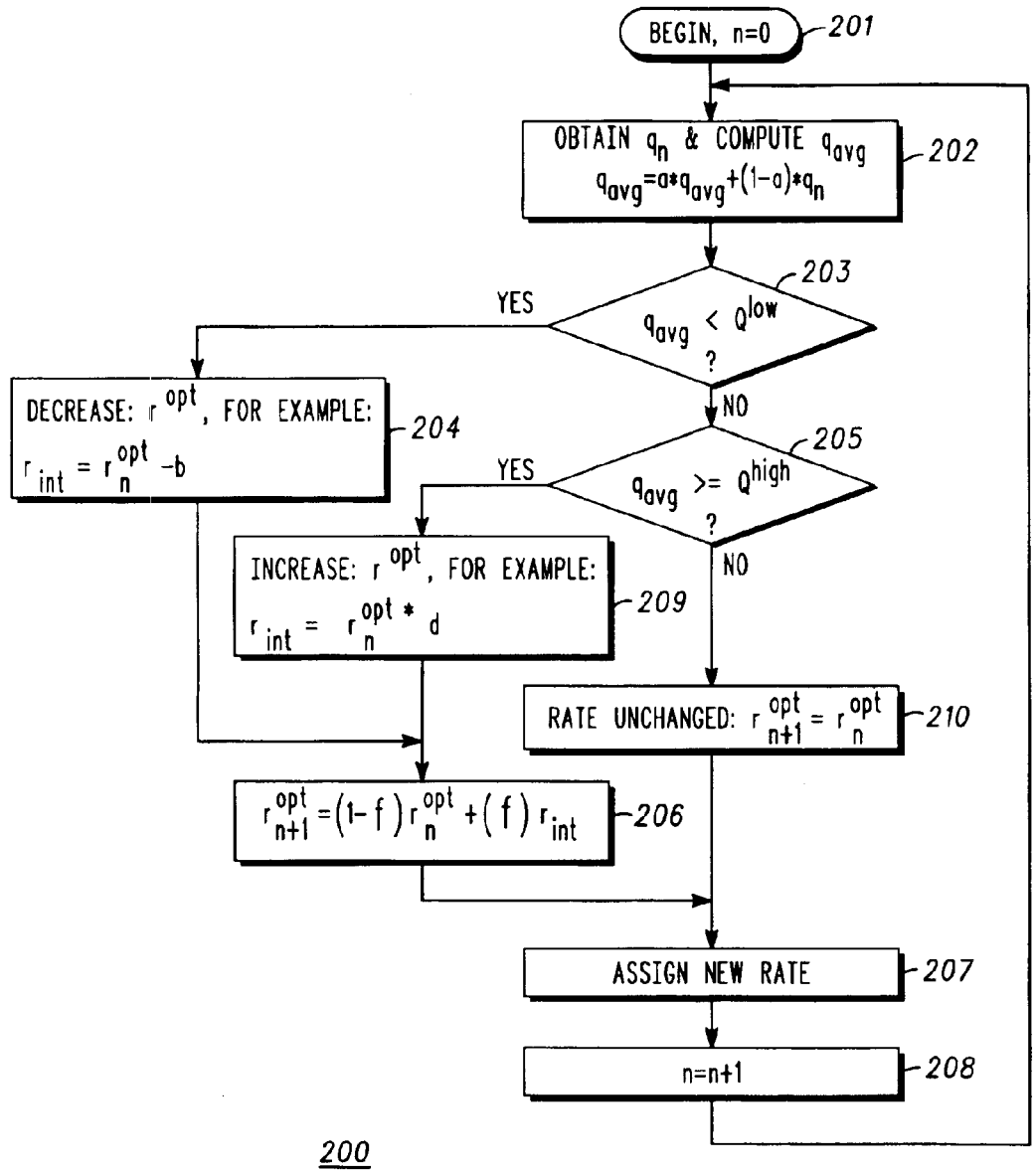
FIG. 3 is a flow chart illustrating the data rate optimization algorithm of the preferred embodiment of the present invention.
Figure 4:
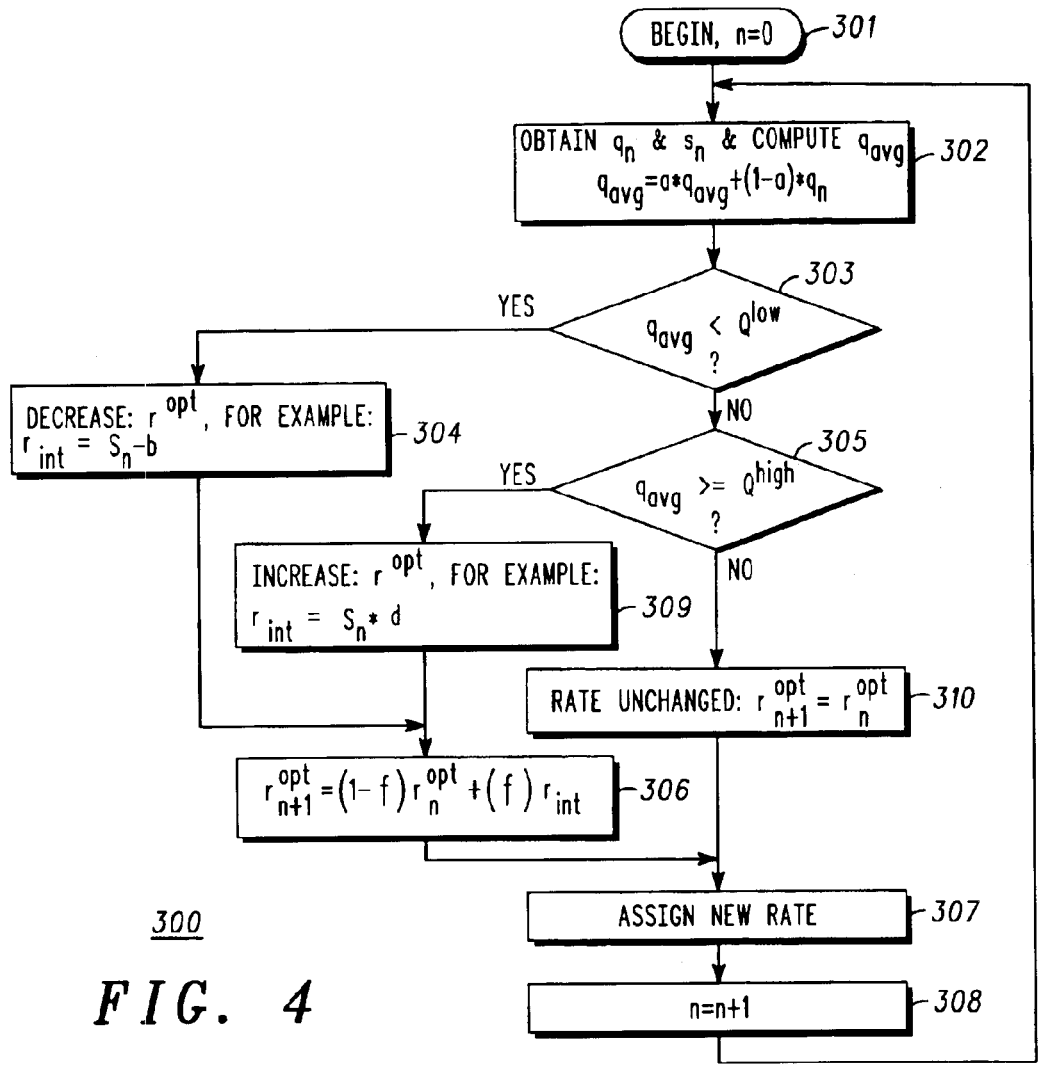
FIG. 4 is a flow chart illustrating an alternate embodiment of the data rate optimization algorithm of the present invention that considers the data rate of the input data transmission.

Referring briefly to FIGS. 3 and 4, the data rate optimization algorithms 200 and 300 of the present invention presume that an RF forward link 104 has been established between the wireless infrastructure 103 and a wireless mobile receiving device 105 and that data transmissions have begun at a predetermined initial data rate. It is common for the predetermined initial data rate to be the minimum data rate that still maintains a sufficient QoS to the wireless mobile receiving device 105. However, other parameters (e.g., previous data rates, current data rates, average data rates, etc.) and any combination of parameters may be considered when establishing the initial data rate without impacting the algorithms 200 and 300 of the present invention.

Referring to FIG. 3, a flow chart illustrating the data rate optimization algorithm 200 of the preferred embodiment of the present invention is shown. The data rate optimization algorithm 200 begins at step 201 by resetting its internal counter (n) to zero. As the algorithm 200 proceeds, $r^{opt}$ is updated and allocated every T msec. The algorithm 200 performs according to the previously described pseudo code and as described in further detail below for each $n^{th}$ update to $r^{opt}$. At step 202, the processor obtains the current size of the queue ($q_n$) for the data transmission and computes an average size of the queue ($q_{avg}$) according to the equation $q_{avg}=a*q_{avg}+(1-a)*q_n$. At step 203, the processor compares $q_{avg}$ to $Q^{low}$. If $q_{avg}$ is less than $Q^{low}$, the processor proceeds to step 204, otherwise it proceeds to step 205. When $q_{avg}$ is less than $Q^{low}$, step 204 will call for a decrease in $r^{opt}_{n+1}$. At step 204, an internal variable ($r_{int}$) will be computed according to the equation $r_{int}=r^{opt}_n-b$. The processor will next proceed to step 206 and compute $r^{opt}_{n+1}$ according to the equation $r^{opt}_{n+1}=(1-f)*r^{opt}_n+f*r_{int}$. The processor will next proceed to step 207 and communicate the new data rate to the data rate assignment circuitry in the SDU. The processor will next proceed to step 208 and increment its internal counter (n) by 1. The processor will continue to process the algorithm by recycling to step 202 as long as the data transmission is active.

The processor reaches step 205 if $q_{avg}$ is not less than $Q^{low}$. At step 205, the processor compares $q_{avg}$ to $Q^{high}$. If $q_{avg}$ is greater than or equal to $Q^{high}$, the processor proceeds to step 209, otherwise it proceeds to step 210. When $q_{avg}$ is greater than or equal to $Q^{high}$, step 209 will call for an increase in $r^{opt}_{n+1}$. At step 209, an internal variable ($r_{int}$) will be computed according to the equation $r_{int}=r^{opt}_n*d$. The processor will next proceed to step 206 and compute $r^{opt}_{n+1}$ according to the equation $r^{opt}_{n+1}=(1-f)*r^{opt}_n+f*r_{int}$. The processor will next proceed to step 207 and communicate the new data rate to the data rate assignment circuitry in the SDU. The processor will next proceed to step 208 and increment its internal counter (n) by 1. The processor will continue to process the algorithm by recycling to step 202 as long as the data transmission is active.

The processor reaches step 210 if $q_{avg}$ is not less than $Q^{low}$ and also not greater than or equal to $Q^{high}$. At step 210, the processor sets $r^{opt}_{n+1}$ equal to $r^{opt}_n$. The processor will next proceed to step 207 and communicate the new data rate to the data rate assignment circuitry in the SDU. The processor will next proceed to step 208 and increment its internal counter (n) by 1. The processor will continue to process the algorithm by recycling to step 202 as long as the data transmission is active.

In an alternate embodiment, $r^{opt}$ is determined by applying a modified data rate optimization algorithm that introduces consideration of the input data rate of the data transmission to the SDU as represented by the following pseudo code:

```
q_avg = a * q_avg + (1-a) * q_n;
If (q_avg < Q^low)
    r_int = s_n - b;
else if (Q^low =< q_avg < Q^high)
    r_int = s_n;                    /* maintain queue size */
else                                /* q_avg >= Q^high */
    r_int = d * s_n;                /* d > 1 */
r^opt_{n+1} = (1-f) * r^opt_n + f * r_int;   /* f ∈ (0,1) */
```

Where:
$q_n$ is the current size of the queue for the data transmission;

a is a value between 0 and 1, typically between 0.5 and 0.9;

$q_{avg}$ is the average size of the queue which is accumulated from $q_n$ and dampened according to a;

$Q^{low}$ is the low threshold for the average size of the queue;

$s_n$ is the current input data rate for the data transmission from the computer equipment infrastructure;

b is a value less than the current input data rate;

$r_{int}$ is an internal variable used in calculating the optimized data rate;

$Q^{high}$ is the high threshold for the average size of the queue;

d is a value greater than 1, but less than $c^N/s_n$;

f is a value between 0 and 1;

$r^{opt}_n$ is the current optimized data rate for the data transmission via the wireless infrastructure; and, $r^{opt}_{n+1}$ is the new optimized data rate that is accumulated from $r_{int}$ and dampened according to f.

Referring to FIG. 4, a flow chart illustrating an alternate embodiment of the data rate optimization algorithm 300 of the present invention that considers the data rate of the input data transmission is shown. The data rate optimization algorithm 300 begins at step 301 by resetting its internal counter (n) to zero. As the algorithm 300 proceeds, $r^{opt}$ is updated and allocated every T msec. The algorithm 300 performs according to the pseudo code described above and as described in further detail below for each $n^{th}$ update to $r^{opt}$. At step 302, the processor obtains the current size of the queue ($q_n$) and the current input data rate ($s_n$) for the data transmission and computes an average size of the queue ($q_{avg}$) according to the equation $q_{avg}=a*q_{avg}+(1-a)*q_n$. At step 303, the processor compares $q_{avg}$ to $Q^{low}$. If $q_{avg}$ is less than $Q^{low}$, the processor proceeds to step 304, otherwise it proceeds to step 305. When $q_{avg}$ is less than $Q^{low}$, step 304 will call for a decrease in $r^{opt}_{n+1}$. At step 304, an internal variable ($r_{int}$) will be computed according to the equation $r_{int}=s_n-b$. The processor will next proceed to step 306 and compute $r^{opt}_{n+1}$ according to the equation $r^{opt}_{n+1}=(1-f)*r^{opt}_n+f*r_{int}$. The processor will next proceed to step 307 and communicate the new data rate to the data rate assignment circuitry in the SDU. The processor will next proceed to step 308 and increment its internal counter (n) by 1. The processor will continue to process the algorithm by recycling to step 302 as long as the data transmission is active.

The processor reaches step 305 if $q_{avg}$ is not less than $Q^{low}$. At step 305, the processor compares $q_{avg}$ to $Q^{high}$. If $q_{avg}$ is greater than or equal to $Q^{high}$, the processor proceeds to step 309, otherwise it proceeds to step 310. When $q_{avg}$ is greater than or equal to $Q^{high}$, step 309 will call for an increase in $r^{opt}_{n+1}$. At step 309, an internal variable ($r_{int}$) will be computed according to the equation $r_{int}=s_n*d$. The processor will next proceed to step 306 and compute $r^{opt}_{n+1}$ according to the equation $r^{opt}_{n+1}=(1-f)*r^{opt}_n+f*r_{int}$. The processor will next proceed to step 307 and communicate the new data rate to the data rate assignment circuitry in the SDU. The processor will next proceed to step 308 and increment its internal counter (n) by 1. The processor will continue to process the algorithm by recycling to step 302 as long as the data transmission is active.

The processor reaches step 310 if $q_{avg}$ is not less than $Q^{low}$ and also not greater than or equal to $Q^{high}$. At step 310, the processor sets $r^{opt}_{n+1}$ equal to $r^{opt}_n$. The processor will next proceed to step 307 and communicate the new data rate to the data rate assignment circuitry in the SDU. The processor will next proceed to step 308 and increment its internal counter (n) by 1. The processor will continue to process the algorithm by recycling to step 302 as long as the data transmission is active.

Figure 5:
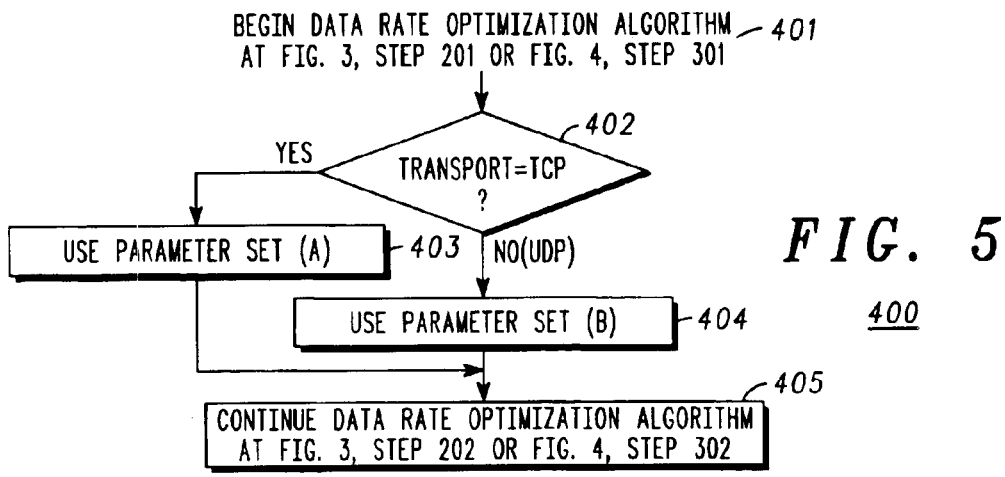
FIG. 5 is a flow chart illustrating a routine that can optionally be incorporated in the data rate optimization algorithms of FIGS. 3 or 4 to consider the transport protocol of the input data transmission.

Referring to FIG. 5, a flow chart illustrating a routine 400 that can optionally be incorporated in the data rate optimization algorithms of FIG. 3 or FIG. 4 is shown. The optional routine 400 introduces the consideration of the transport protocol of the input data transmission to the SDU in either algorithm. As step 401 indicates, the optional routine 400 begins after FIG. 3, step 201 or FIG. 4, step 301 depending on which embodiment of the data rate optimization algorithm is implemented. At step 402, the processor checks if the transport protocol of the input data is TCP. If the transport protocol is TCP, the processor proceeds to step 403, otherwise it proceeds to step 404. At step 403, the processor sets the values for the constants in the data rate optimization algorithm (i.e., a, b, d, f, $Q^{low}$, and $Q^{high}$) to pre-selected values stored in parameter set A. The parameter values stored in parameter set A are uniquely tailored to data transmissions from a computer equipment infrastructure using TCP. As step 405 indicates, the processor will next continue the data rate optimization algorithm at FIG. 3, step 202 or FIG. 4, step 302 depending on which embodiment of the data rate optimization algorithm is implemented.

The processor reaches step 404 if the transport protocol is not TCP. When the transport protocol is not TCP, it is presumed to be UDP. Therefore, at step 404, the processor sets the values for the constants in the data rate optimization algorithm (i.e., a, b, d, f, $Q^{low}$, and $Q^{high}$) to pre-selected values stored in parameter set B. The parameter values stored in parameter set B are uniquely tailored to data transmissions from an computer equipment infrastructure using UDP. As step 405 indicates, the processor will next continue the data rate optimization algorithm at FIG. 3, step 202 or FIG. 4, step 302 depending on which embodiment of the data rate optimization algorithm is implemented.

Summarizing the detailed description provided above, the several embodiments provide an apparatus and method that optimizes the data rate for data transmissions in an RF forward link 104 of spread-spectrum communications systems 106. The apparatus and method addresses and fulfills the previously mentioned need to maximize usage of the transmission bandwidth within the spread-spectrum communications system 106, while also maintaining a sufficient QoS to the wireless mobile receiving unit 105. The data rate is optimized at the SDU 111 of the wireless infrastructure 103 of the spread-spectrum communications system 106. The optimization is accomplished by estimating or measuring the bottleneck link speed of the data transmission and adjusting the data rate for the RF forward link 104 according to the several embodiments of the present invention.

As for the apparatus of the present invention, the spread-spectrum communications system 106 comprises a wireless infrastructure 103, at least one wireless mobile receiving device 105, and an RF forward link 104 between the wireless infrastructure 103 and the wireless mobile receiving device 105. The wireless infrastructure 103 further comprises at least one SDU 111, the SDU 111 including an input data buffer 115, an output data queue 116, a processor 117, and rate assignment circuitry 118.

It should be understood that the implementation of other variations and modifications of the invention in its various aspects will be apparent to those of ordinary skill in the art, and that the invention is not limited by the specific embodiments described. For example, one of ordinary skill in the art will recognize that the data rate optimization algorithms in either embodiment described above could be implemented for input data transmissions from a computer equipment infrastructure using transmission protocols other than the TCP or UDP protocols described. Furthermore, one of ordinary skill in the art will also recognize that the data rate optimization algorithms in either embodiment described above could be implemented for input data transmissions from other sources than the computer equipment infrastructure described. It is the intent of the inventors that such modifications can be made to the present invention without varying from the spirit and scope of the invention, and it is intended that all such modifications come within the scope of the following claims and their equivalents.

What is claimed is:

1. A method for transmitting data packets from an output queue to a wireless mobile device across a forward radio frequency link of an associated spread-spectrum communications system, the method comprising the steps of:

a) determining a weighted average level of the output queue while transmitting a data packet at a first data rate, wherein the weighted average level is determined according to the equation $q_{avg}=(a)q_{avg}+(1-a)q_n$, where a is a weighting factor, $q_n$ is a present level of the output queue, and $q_{avg}$ is the weighted average level of the output queue;

b) transmitting a subsequent data packet at a second data rate that is lower than the first data rate when the weighted average level of the output queue is below a low threshold value; and c) transmitting a subsequent data packet at a third data rate that is higher than the first data rate when the weighted average level of the output queue is equal to or above a high threshold value.

2. The method of claim 1, wherein step b) comprises the steps of:

d) determining an internal data rate adjustment value according to the equation $r_{int}=r^{opt}_n-b$, where $r^{opt}_n$ is the first data rate, and b is a constant with a value less than the first data rate; and e) determining the second data rate according to the equation $r^{opt}_{n+1}=(1-f)r^{opt}_n+(f)r_{int}$, where f is a weighting factor, $r^{opt}_n$ is the first data rate, $r_{int}$ is the internal data rate adjustment value, and $r^{opt}_{n+1}$ is the second data rate.

3. The method of claim 2, wherein step c) comprises the steps of:
- f) determining the internal data rate adjustment value according to the equation $r_{int}=(d)r^{opt}_n$, where d is a constant that is greater than one, but less than a ratio of a maximum achievable data rate to the first data rate, and $r^{opt}_n$ is the first data rate; and
- g) determining the third data rate according to the equation $r^{opt}_{n+1}=(1-f)r^{opt}_n+(f)r_{int}$, 502 where f is a weighting factor, $r^{opt}_n$ is the first data rate $r_{int}$ is the internal data rate adjustment value, and $r^{opt}_{n+1}$ is the third data rate.

4. The method of claim 1, wherein step c) comprises the steps of:
- d) determining an internal data rate adjustment value according to the equation $r_{int}=(d)r^{opt}_n$, where d is a constant that is greater than one, but less than a ratio of a maximum achievable data rate to the first data rate, and $r^{opt}_n$ is the first data rate; and
- e) determining the third data rate according to the equation $r^{opt}_{n+1}=(1-f)^{opt}_n+(f)r_{int}$, where f is a weighting factor, $r^{opt}_n$ is the first data rate, $r_{int}$ is the internal data rate adjustment value, and $r^{opt}_{n+1}$ is the third data rate.

5. The method of claim 1, further comprising the steps of:
- d) before step a), determining a transport protocol of data packets received from an upstream component of the associated spread-spectrum communications system; and
- e) selecting a parameter set from a plurality of predetermined parameter sets based on the transport protocol, each parameter set containing parameter values for determining one or more of the weighted average level of the output queue, the second data rate, and the third data rate.

6. The method of claim 1, further comprising the step of:
- d) determining an input data rate for data packets received from an upstream component of the associated spread-spectrum communications system;

wherein step b) comprises the step of:
- e) determining the second data rate based on the input data rate; and wherein step c) comprises the step of:
- f) determining the third data rate based on the input data rate.

7. The method of claim 1, further comprising the step of:
- d) determining an input data rate for data packets received from an upstream component of the associated spread-spectrum communications system; and wherein step b) comprises the steps of:
- e) determining an internal data rate adjustment value according to the equation $r_{int}=s_n-b$, where $s_n$ is the input data rate, and b is a constant with a value less than the first data rate; and
- f) determining the second data rate according to the equation $r^{opt}_{n+1}=(1-f)r^{opt}_n+(f)r_{int}$, where f is a weighting factor, $r^{opt}_n$ is the first data rate, $r_{int}$ is the internal data rate adjustment value, and $r^{opt}_{n+1}$ is the second data rate.

8. The method of claim 1, further comprising the step of:
- d) determining an input data rate for data packets received from an upstream component of the associated spread-spectrum communications system; and wherein step c) comprises the steps of:
- e) determining an internal data rate adjustment value according to the equation $r_{int}=s_n(d)$, where d is a constant that is greater than one, but less than a ratio of a maximum achievable data rate to the first data rate, and $s_n$ is the input data rate; and
- f) determining the third data rate according to the equation $r^{opt}_{n+1}=(1-f)r^{opt}_n+(f)r_{int}$, where f is a weighting factor, $r^{opt}_n$ is the first data rate, $r_{int}$ is the internal data rate adjustment value, and $r^{opt}_{n+1}$ is the third data rate.

9. An apparatus associated with a wireless infrastructure that optimizes a rate of transmitting forward link data to a wireless mobile device across a forward radio frequency link, the apparatus comprising:
- an output queue that stores forward link data to be transmitted to the wireless mobile device; and
- a processor programmed to adjust a rate of forward link data transmission based on a weighted average queue value for the output queue, wherein the processor is programmed to determine the weighted average queue value according to the equation $q_{avg}=(a)q_{avg}+(1-a)q_n$, where a is a weighting factor, $q_n$ is a present level of the output queue, and $q_{avg}$ is the weighted average queue value.

10. The apparatus of claim 9, wherein the processor is further programmed to decrease the rate of forward link data transmission from a first data rate to a second data rate when the weighted average queue value is below a first predetermined threshold, and to increase the rate of forward link data transmission from the first data rate to a third data rate when the weighted average queue value is equal to or above a second predetermined threshold.

11. The apparatus of claim 10, wherein the processor is further programmed to determine an internal data rate adjustment value according to the equation $r_{int}=r^{opt}_n-b$, where $r^{opt}_n$ is the first data rate, and b is a constant with a value less than the first data rate; and to determine the second data rate according to the equation $r^{opt}_{n+1}=(1-f)r^{opt}_n+(f)r_{int}$, where f is a weighting factor, $r^{opt}_n$ is the first data rate, $r_{int}$ is the internal data rate adjustment value, and $r^{opt}_{n+1}$ is the second data rate.

12. The apparatus of claim 10, wherein the processor is further programmed to determine an internal data rate adjustment value according to the equation $r_{int}=(d)r^{opt}_n$, where d is a constant that is greater than one, but less than a ratio of a maximum achievable data rate to the first data rate, and $r^{opt}_n$ is the first data rate; and to determine the third data rate according to the equation $r^{opt}_{n+1}=(1-f)r^{opt}_n+(f)r_{int}$, where f is a weighting factor, $r^{opt}_n$ is the first data rate, $r_{int}$ is the internal data rate adjustment value, and $r^{opt}_{n+1}$ is the third data rate.

13. The apparatus of claim 9, wherein the apparatus further comprises an input buffer, and the processor is further programmed to adjust the rate of forward link data transmission based on a particular transport protocol of the forward link data received at the input buffer.

14. The apparatus of claim 9, wherein the apparatus further comprises an input buffer, and the processor is further programmed to adjust the rate of forward link data transmission based on an input data rate of the forward link data received at the input buffer.

15. The apparatus of claim 14, wherein the processor is further programmed to determine an internal data rate adjustment value according to the equation $r_{int}=s_n-b$, where $s_n$ is the input data rate, and b is a constant with a value less than the input data rate; and to determine the rate of forward link data transmission according to the equation $r^{opt}_{n+1}=(1-f)r^{opt}_n+(f)r_{int}$, where f is a weighting factor, $r^{opt}_n$ is a first data rate for forward link data transmission, $r_{int}$ is the internal data rate adjustment value, and $r^{opt}_{n+1}$ is a second data rate for forward link data transmission.

16. The apparatus of claim 14, wherein the processor is further programmed to determine an internal data rate adjustment value according to the equation $r_{int}=s_n(d)$, where d is a constant that is greater than one, but less than a ratio of a maximum achievable data rate to the input data rate, and $s_n$ is the input data rate; and to determine the rate of forward link data transmission according to the equation $r^{opt}_{n+1}=(1-f)r^{opt}_n+(f)r_{int}$, where f is a weighting factor, $r^{opt}_n$ is a first data rate for forward link data transmission, $r_{int}$ is the internal data rate adjustment value, and $r^{opt}_{n+1}$ is a second data rate for forward link data transmission.

17. A method for data transmission within a spread-spectrum communications system, the method comprising the steps of:
 a) determining that data should be transmitted by a wireless infrastructure to a wireless mobile device via a forward link;
 b) determining a current size of a queue for the forward link data transmission;
 c) determining a weighted average size of the queue during the forward link data transmission, wherein the weighted average size is determined according to the equation $q_{avg}=(a)q_{avg}+(1-a)q_n$, where a is a weighting factor, $q_n$ is the current size of the queue, and $q_{avg}$ is the weighted average size of the queue;
 d) decreasing a data rate for the forward link data transmission when the weighted average size of the queue is below a low threshold value, otherwise comparing the weighted average size of the queue to a high threshold value;
 e) increasing the data rate for the forward link data transmission when the weighted average size of the queue is greater than or equal to the high threshold value, otherwise leaving the data rate for the forward link data transmission unchanged; and
 f) transmitting data in packets to the wireless mobile device via the forward link at the forward link data transmission rate.

* * * * *